United States Patent [19]

Kinoshita et al.

[11] Patent Number: 4,523,134
[45] Date of Patent: Jun. 11, 1985

[54] CONTROL SYSTEM FOR DC MOTORS

[75] Inventors: Hisashi Kinoshita, Katano; Hideki Yoshitake, Toyonaka; Nin Kake, Takarazuka, all of Japan

[73] Assignee: Matsushita Electrical Industrial Co., Ltd., Osaka, Japan

[21] Appl. No.: 608,249

[22] Filed: May 8, 1984

[51] Int. Cl.³ .............................................. H02P 5/00
[52] U.S. Cl. ................... 318/313; 318/317; 318/327; 318/341; 318/599
[58] Field of Search ............. 318/301, 311, 312, 313, 318/314, 315, 316, 317, 318, 323, 324, 325, 326, 318/327, 329, 345 A, 345 B, 345 E, 599, 341, 318/600, 601, 603, 604, 606, 616, 618, 607

[56] References Cited

U.S. PATENT DOCUMENTS

| | | | |
|---|---|---|---|
| 3,525,029 | 8/1970 | Joslyn et al. | 318/599 |
| 3,947,738 | 3/1976 | Oliver | 318/341 |
| 3,974,428 | 8/1976 | Hafle | 318/314 |
| 3,978,384 | 8/1976 | Gucker | 318/317 X |
| 4,038,588 | 7/1977 | Woolfson et al. | 318/599 X |
| 4,387,325 | 6/1983 | Klimo | 318/317 X |
| 4,454,573 | 6/1984 | Petsch et al. | 318/599 X |

Primary Examiner—William M. Shoop
Assistant Examiner—Paul Shik Luen Ip
Attorney, Agent, or Firm—Spencer & Frank

[57] ABSTRACT

In a DC motor control system, switching element driving circuits are connected to respective base circuits of four switching elements arranged to form a bridge circuit which has a DC motor connected thereto as an electric load thereon, and an output signal interlocking circuit is provided in each paired driving circuits associated with the corresponding paired switching elements which are connected in series across a DC power source, respectively, thereby preventing simultaneous conduction of each paired switching elements. By virtue of the provision of the output signal interlocking circuits, it is possible to realize a PWM control system for DC motors with a simplified circuit construction and yet to thereby prevent power source short-circuiting trouble with elevated safety and reliability.

6 Claims, 7 Drawing Figures

CONTROL SYSTEM FOR DC MOTORS

This invention relates to control systems for DC motors, and more particularly to a control system which controls a DC motor used in a robot, a machine tool or the like according to the technique of pulse width modulation (which will be abbreviated hereinafter as PWM).

In order to give clear understanding of the construction and operation of a conventional control system, an explanation will hereinafter be made of an exemplifying prior art control system by making reference to FIGS. 1 to 4.

A system having the structure shown in FIG. 1 is known as one of prior art control systems of this kind. FIG. 2 shows an exemplified practical construction of power transistor driving circuit 13 shown in FIG. 1. FIG. 3 shows modes of switching four power transistors $Tr_1$ to $Tr_4$ constituting a bridge circuit supplying a power supply voltage $V_D$ to a DC motor 18 shown in FIG. 1, and FIG. 4 shows operating waveforms at various parts of the electric circuit shown in FIG. 1.

Referring to FIG. 1, a speed command signal a is externally applied to a subtractor 1 which subtracts a speed feedback signal b from the externally applied speed command signal a, and a speed amplifier 2 amplifies an output signal c from the subtractor 1 to convert it into a current command signal d. A second subtractor 3 subtracts a current feedback signal e from the current command signal d to generate an output signal f, and a current amplifier 4 amplifies the input signal f to generate a control signal g. A triangular waveform generating circuit 5 generates a triangular waveform signal h. A third subtractor 6 subtracts the triangular waveform signal h from the control signal g to generate an output signal $n_1$, and an adder 7 adds the triangular waveform signal h to the control signal g to generate an output signal $n_2$. A comparator 8 compares the input signal $n_1$ with a set voltage $\Delta V$ and generates an output pulse $j_1$ when the level of the input signal $n_1$ is higher than $+\Delta V$, and a second comparator 9 compares the input signal $n_1$ with a set voltage $-\Delta V$ and generates an output pulse $j_2$ when the level of the input signal $n_1$ is lower than $-\Delta V$. A third comparator 10 compares the input signal $n_2$ with the set voltage $-\Delta V$ and generates an output pulse $j_3$ when the level of the input signal $n_2$ is lower than $-\Delta V$, and a fourth comparator 11 compares the input signal $n_2$ with the set voltage $\Delta V$ and generates an output pulse $j_4$ when the level of the input signal $n_2$ is higher than $+\Delta V$. An interface circuit 12 converts the input signals $j_1$, $j_2$, $j_3$ and $j_4$ into output signals $k_1$, $k_2$, $k_3$ and $k_4$, respectively, and provides electrical isolation between the input signals and the output signals. Power transistor driving circuits 13, 14, 15 and 16 convert the input signals $k_1$, $k_2$, $k_3$ and $k_4$ into drive signals $m_1$, $m_2$, $m_3$ and $m_4$, respectively. Power transistors $Tr_1$, $Tr_2$, $Tr_3$ and $Tr_4$ constitute a bridge circuit for applying a power supply voltage $V_D$ from a DC power source 17 to a DC motor 18, and flywheel diodes $D_1$, $D_2$, $D_3$ and $D_4$ are connected in parallel with the power transistors $Tr_1$, $Tr_2$, $Tr_3$ and $Tr_4$, respectively. A speed sensing unit such as a tachogenerator 19 is directly coupled to the DC motor 18 to generate the speed feedback signal b proportional to the rotation speed of the DC motor 18. A current sensing unit 20 generates the current feedback signal e proportional to an electric current $i_M$ supplied to the DC motor 18.

Referring to FIG. 2, reference numeral 38b designates a phototransistor on the secondary side of a photocoupler, which is a part of the interface circuit 12 and converts the input signal $j_1$ to the interface circuit 12 into the signal $k_1$; 31 designates a DC power source of the driving circuit 13; and $Tr_5$, $Tr_6$ and $Tr_7$ designate transistors.

Power transistor switching modes in the prior art control system having such structure will be described with reference to FIG. 3. Although the flywheel diodes $D_1$ to $D_4$ are not shown in FIG. 3 for simplicity of illustration, it should be understood that such diodes are connected in parallel with the power transistors $Tr_1$ to $Tr_4$, respectively.

In a mode 1, the voltage applied across the DC motor 18 is null (zero), and due to a voltage induced by the rotating DC motor 18, an electric current $i_M$ flows through the power transistor $Tr_1$ or $Tr_3$ and an associated flywheel diode. At (a) of the mode 1, the power transistor $Tr_1$ is turned on; at (b) of the mode 1, the power transistor $Tr_3$ is turned on; and at (c) of the mode 1, the power transistors $Tr_1$ and $Tr_3$ are turned on, but with all of the other power transistors remaining non-conductive.

In a mode 2, the voltage applied across the DC motor 18 is also null, and due to a voltage induced by the rotating DC motor 18, an electric current $i_M$ flows through the power transistor $Tr_4$ or $Tr_2$ and an associated flywheel diode. At (a) of the mode 2, the power transistor $Tr_4$ is turned on; at (b) of the mode 2, the power transistor $Tr_2$ is turned on; and at (c) of the mode 2, the power transistors $Tr_2$ and $Tr_4$ are turned on, but with all of the other power transistors remaining non-conductive.

In a mode 3, the power transistors $Tr_2$ and $Tr_3$ are turned on, and the power supply voltage $V_D$ is applied across the DC motor 18 to cause the current $i_M$ to flow therethrough.

In a mode 4, the power transistors $Tr_1$ and $Tr_4$ are turned on, and the power supply voltage $V_D$ is applied across the DC motor 18 to cause the current $i_M$ to flow therethrough. In a mode 5, all of the power transistors $Tr_1$ to $Tr_4$ are turned off.

The operation of the prior art control system shown in FIG. 1 and that of the driving circuit 13 shown in FIG. 2 will be described with reference to FIG. 4 showing operation waveforms at various parts.

The output signal c of the subtractor 1 indicative of the result of the subtraction of the speed feedback signal b from the externally applied speed command signal a is amplified by the speed amplifier 2 which generates the current command signal d. Then, the output signal f of the subtractor 3 indicative of the result of the subtraction of the current feedback signal e from the current command signal d is amplified by the current amplifier 4 which generates the control signal g. The triangular waveform signal h generated by the triangular waveform generating circuit 5 has a constant amplitude of $\pm Vh$ and a constant period $T_0$. The triangular waveform signal h is subtracted from the control signal g in the subtractor 6 which generates the output signal $n_1$, and the signal h is added to the control signal g in the adder 7 which generates the output signal $n_2$.

The signal $n_1$ is applied to the comparators 8 and 9. When the relation $n_1 > +\Delta V$ holds between the input signal $n_1$ and the set voltage $\Delta V$, the output pulse $j_1$ of a high level is generated from the comparator 8, while, when the relation $n_1 < -\Delta V$ holds, the output pulse $j_2$ of a high level is generated from the comparator 9. On the other hand, when the relation $-\Delta V \leq n_1 \leq +\Delta V$ holds between $n_1$ and $\Delta V$, both of the output pulses $j_1$ and $j_2$ have a low level. The time interval between the pulses $j_1$ and $j_2$ is $\Delta T$. The signal $n_2$ is applied to the comparators 10 and 11. Similarly, when the relation $n_2 > +\Delta V$ holds between the input signal $n_2$ and the set voltage $\Delta V$, the output pulse $j_4$ of a high level is generated from the comparator 11, while, when the relation $n_2 < -\Delta V$ holds, the output pulse $j_3$ of a high level is generated from the comparator 10. On the other hand, when the relation $-\Delta V \leq n_2 \leq +\Delta V$ holds between $n_2$ and $\Delta V$, both of the output pulses $j_3$ and $j_4$ have a low level, and the time interval therebetween is also $\Delta T$.

The interface circuit 12, which inputs the signals $j_1$ to $j_4$, acts to provide electrical isolation between its inputs and outputs so that a switching noise caused by the power transistors $Tr_1$ to $Tr_4$ may not adversely affect the operation of the electric circuits in the preceding stages. Upon receipt of the input signals $j_1$ to $j_4$, the interface circuit 12 generates the output signals $k_1$ to $k_4$, respectively.

Referring to FIG. 2 showing an exemplified practical construction of the driving circuit 13, the output signal $k_1$ from the phototransistor 38b on the secondary side of the photocoupler forming a part of the interface circuit 12 is applied to the driving circuit 13, and it is amplified by the transistors $Tr_5$ and $Tr_6$, and the driving circuit 13 generates the output pulse signal $m_1$ for driving the power transistor $Tr_1$. In FIG. 2, the transistor $Tr_7$ is turned on in response to the turning-off of the transistor $Tr_5$, and, when the transistor $Tr_7$ is turned on, it applies a reverse voltage across the base-emitter junction of the power transistor $Tr_1$, thereby shortening the turn-off recovery time of the power transistor $Tr_1$. The remaining driving circuits 14 to 16 operate similarly. The drive signals $m_1$ to $m_4$ drive the power transistors $Tr_1$ to $Tr_4$, respectively. Here, the operation mode differs depending on the level of the control signal g. FIGS. 4 (a), 4 (b) and 4 (c) show the operation waveforms at various parts of the electric circuit shown in FIG. 1 when the magnitude of the control signal g varies to become g=0, $g = \Delta V$ and $g = V_1 (V_1 > \Delta V)$, respectively. It will be seen from FIG. 4 (c) that, when $g > \Delta V$ holds, the operation mode becomes the mode 3 in which the power transistors $Tr_2$ and $Tr_3$ are simultaneously turned on and apply across the DC motor 18 a voltage having a period $T_0/2$, an amplitude $-V_D$ and a pulse width $T_a$. Then, when the control signal g, which is expressed by $g = V_1$, is applied, the mean voltage $V_M$ applied across the DC motor 18 is represented by the following equation:

$$V_M = -V_D \times \frac{2T_a}{T_0} = -V_D \times \frac{V_1 - \Delta V}{V_h}$$

It can be seen from the above equation that the mean voltage $V_M$ applied across the DC motor 18 can be linearly controlled from zero to $-V_D$ while the magnitude of $V_1$ changes from $\Delta V$ to $(V_h + \Delta V)$.

The operation mode is constituted by the repetition of an operation cycle which comprises the transition in the order of the mode 1→mode 3→mode 2→mode 3, and there flows through the DC motor 18 the current $i_M$ having a repetition frequency which is two times that of the triangular waveform signal h. Though not shown, when the control signal g is of the magnitude represented by $g < -\Delta V$, the operation mode is the mode 4 in which the power transistors $Tr_1$ and $Tr_4$ are simultaneously turned on to apply the power supply voltage $+V_D$ across the DC motor 18. Then, when the control signal g, which is expressed by g=V, is applied, the mean voltage $V_M$ applied across the DC motor 18 is represented by the following equation:

$$V_M = V_D \times \frac{-V_1 - \Delta V}{V_h}$$

It can be seen that the mean voltage $V_M$ applied across the DC motor 18 can be linearly controlled from zero to $+V_D$ while the magnitude of $V_1$ changes from $-\Delta V$ to $(-V_h - \Delta V)$. The operation mode is constituted by the repetition of an operation cycle which comprises the transition in the order of the mode 1→mode 4→mode 2 →mode 4, and there flows through the DC motor 18 the current $i_M$ having a repetition frequency which is two times that of the triangular waveform signal h. On the other hand, when the control signal g is of the magnitude represented by $0 \leq g \leq \Delta V$, there is no mode in which both of the drive signals $m_2$ and $m_3$ for driving the respective power transistors $Tr_2$ and $Tr_3$ have a high level, and hence no voltage is applied across the DC motor 18. Similarly, when the control signal g is of the magnitude represented by $-\Delta V \leq g \leq 0$, there is no mode in which both of the drive signals $m_1$ and $m_4$ for driving the respective power transistors $Tr_1$ and $Tr_4$ have a high level, and hence no voltage is applied across the DC motor 18. Thus, when the magnitude of the control signal g is in the range of $-\Delta V \leq g \leq \Delta V$, no voltage is applied across the DC motor 18, and such a range forms an uncontrollable region which is called a dead zone. It is therefore necessary to decrease the detection level $\Delta V$ of the comparators as far as possible to the extent allowable for the circuit operation.

In the drive signals $m_1$, $m_2$ or $m_3$, $m_4$ for driving the power transistors $Tr_1$, $Tr_2$ or $Tr_3$, $Tr_4$ connected in series across the DC power source 17, respectively, it is necessary to provide the time period $\Delta T$ during which both of such signals $m_1$, $m_2$ or $m_3$, $m_4$, respectively, have a low level. This is because, even after the drive signal $m_1$ has become a low level, the power transistor $Tr_1$ may be turned on if a forward voltage is applied thereacross within the turn-off recovery time $t_{stg}$ of the power transistor $Tr_1$. By selecting the length of $\Delta T$ to be larger than the maximum length of $t_{stg}$, it is possible to have the power transistor $T_{r1}$ turned off completely before the drive signal $m_2$ having a high level is applied to the power transistor $T_{r2}$, so that there is no mode in which both of the power transistors $Tr_1$ and $Tr_2$ are in the conductive state. As seen from FIG. 4, the time period $\Delta T$ in which both of the drive signals $m_1$ and $m_2$ have a low level is provided by the values of the set voltages $+\Delta V$ and $-\Delta V$ of the comparators 8 and 9, respectively, and, in this time period $\Delta T$ where the input signal $n_1$ is $-\Delta V \leq n_1 \leq \Delta V$, both of the pulses $j_1$ and $j_2$ are at a low level. The signals $j_1$ and $j_2$ are converted into the signals $k_1$ and $k_2$ through the interface circuit 12, respectively, and the signals $k_1$ and $k_2$ are then converted into the drive signals $m_1$ and $m_2$ through the driving circuits 13 and 14, respectively. However, the value of $\Delta T$ may vary, if there is involved any time delay in the conversion processes. As described above, it is necessary to shorten the length of $\Delta T$, on one hand, in order to decrease the dead zone, and to lengthen it, on the other hand, in order to prevent a short-circuit of the power source due to simultaneous conduction of the power transistors. Therefore, it has been necessary in the prior art to select $\Delta V$ and $\Delta T$ of suitable minimum values so that the delay time involved in the processes for converting the signals $j_1$ to $j_4$ into the signals $m_1$ to $m_4$, respectively, may be minimized. Thus, the prior art control system is disadvantageous in that expensive high quality photocouplers having a quick response have to be used in the interface circuit 12, and yet, it is impossible to prevent a breakdown of the power transistors from being caused by the simultaneous conduction of the power transistors and the resultant short-circuiting of the power source which are due to possible inclusion of any faulty component in the driving circuits.

With a view to removing such prior art drawbacks as mentioned above, it is a primary object of the present invention to provide an improved DC motor control system having a simplified circuit construction in which inexpensive elements are used to constitute the interface circuit and a breakdown of the power transistors caused by any faulty component involved in the circuit can be prevented.

In order to attain the above object, the DC motor control system according to the present invention comprises a first comparator and a second comparator for generating an output pulse signal when the results of the subtraction and addition of a triangular waveform signal h from and to a control signal g are higher and lower than zero volt, respectively, a first, seconds, third and fourth driving circuits to which an output of the first comparator, its inversion output, an output of the second comparator and its inversion output are applied respectively though an interface circuit, and output interlock circuits provided in the first and second driving circuits and in the third and fourth driving circuits, respectively, whereby the output signals of the respective driving circuits are used to drive power transistors forming a bridge circuit, thereby controlling a DC motor.

The present invention will be apparent from the following detailed description taken in conjunction with the accompanying drawings, in which.

Figure 1:
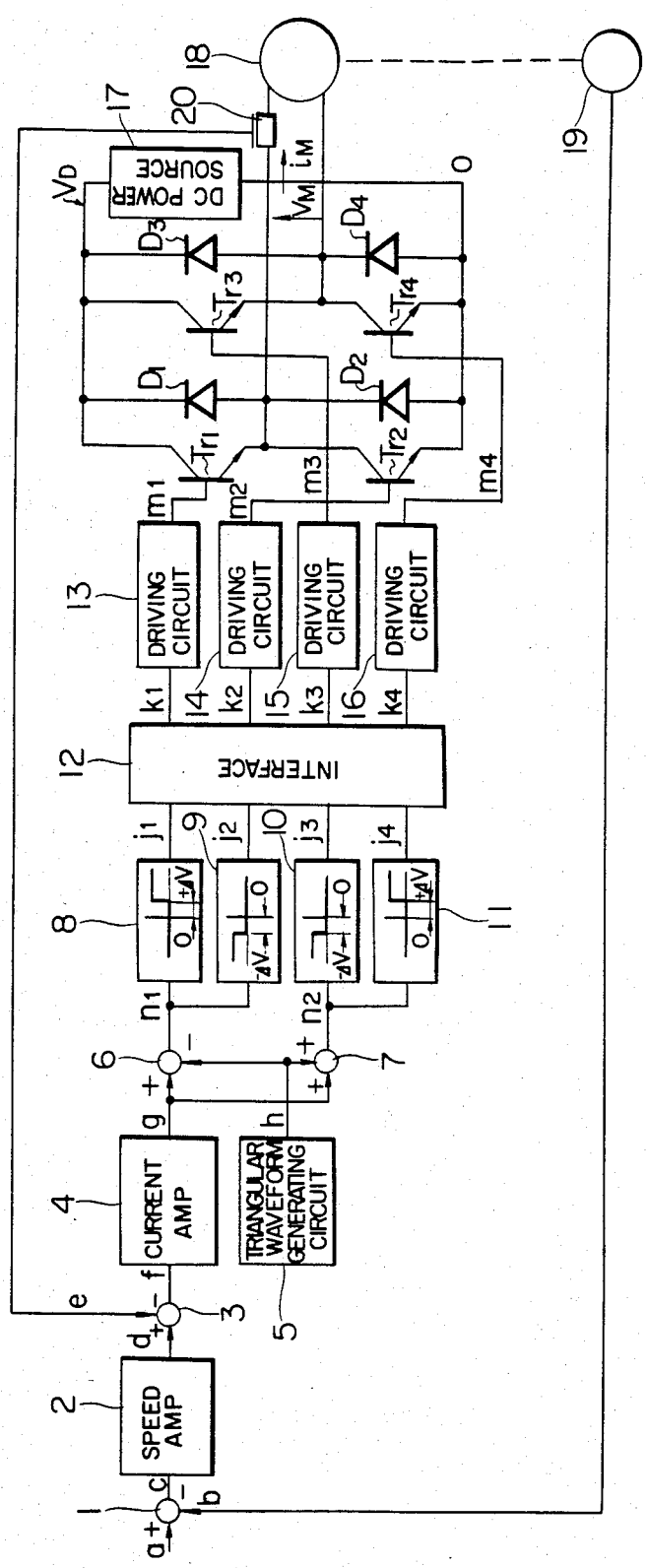
FIG. 1 is a block diagram showing the circuit construction of a prior art DC motor control system.
Figure 2:
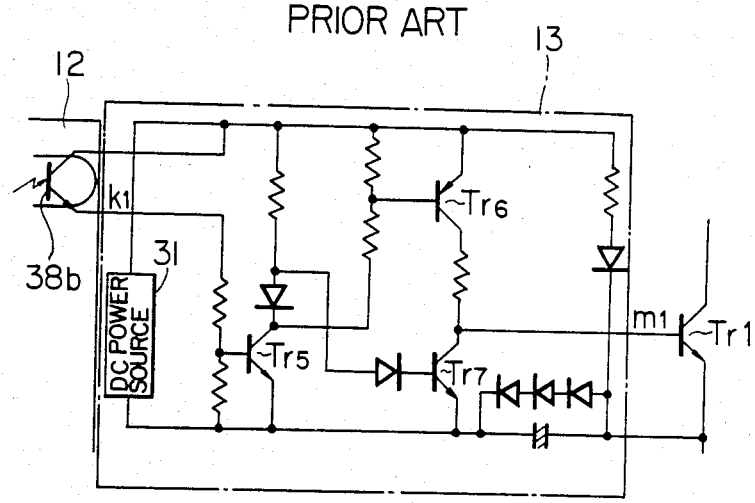
FIG. 2 is a circuit diagram showing the practical structure of one of the driving circuits in the prior art control system.
Figure 3:
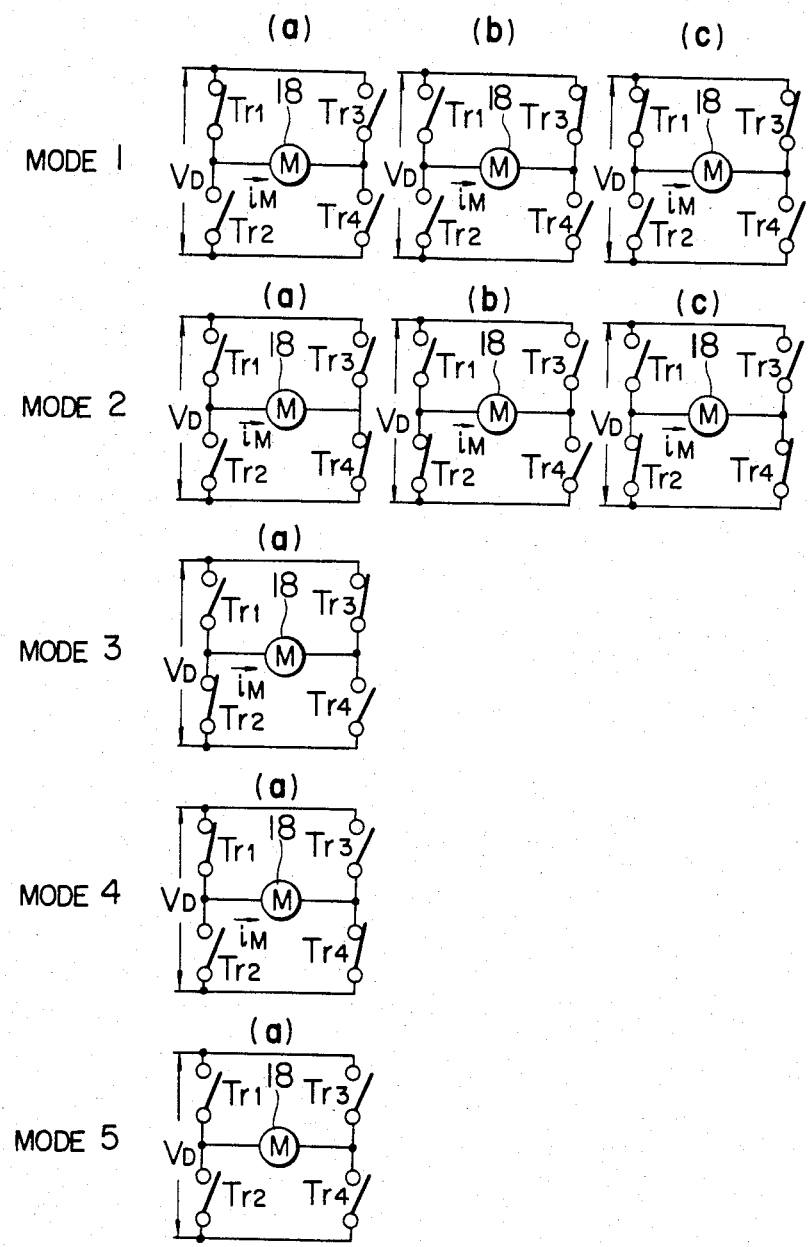
FIG. 3 shows switching modes of the bridge circuit constituted by the four power transistors in the prior art control system.
Figure 4:
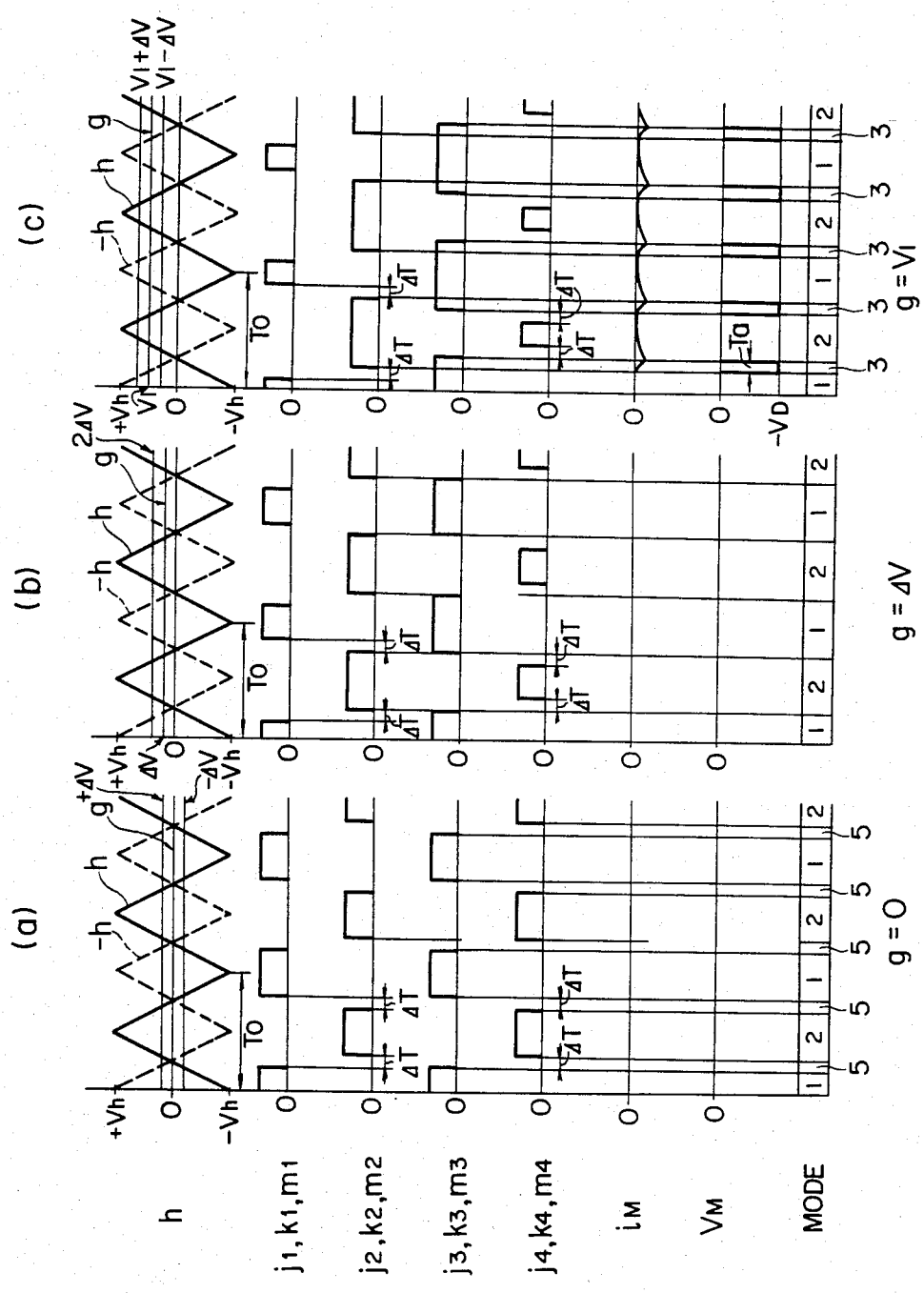
FIG. 4 shows operation waveforms at various parts of the electric circuit shown in FIG. 1.
Figure 5:
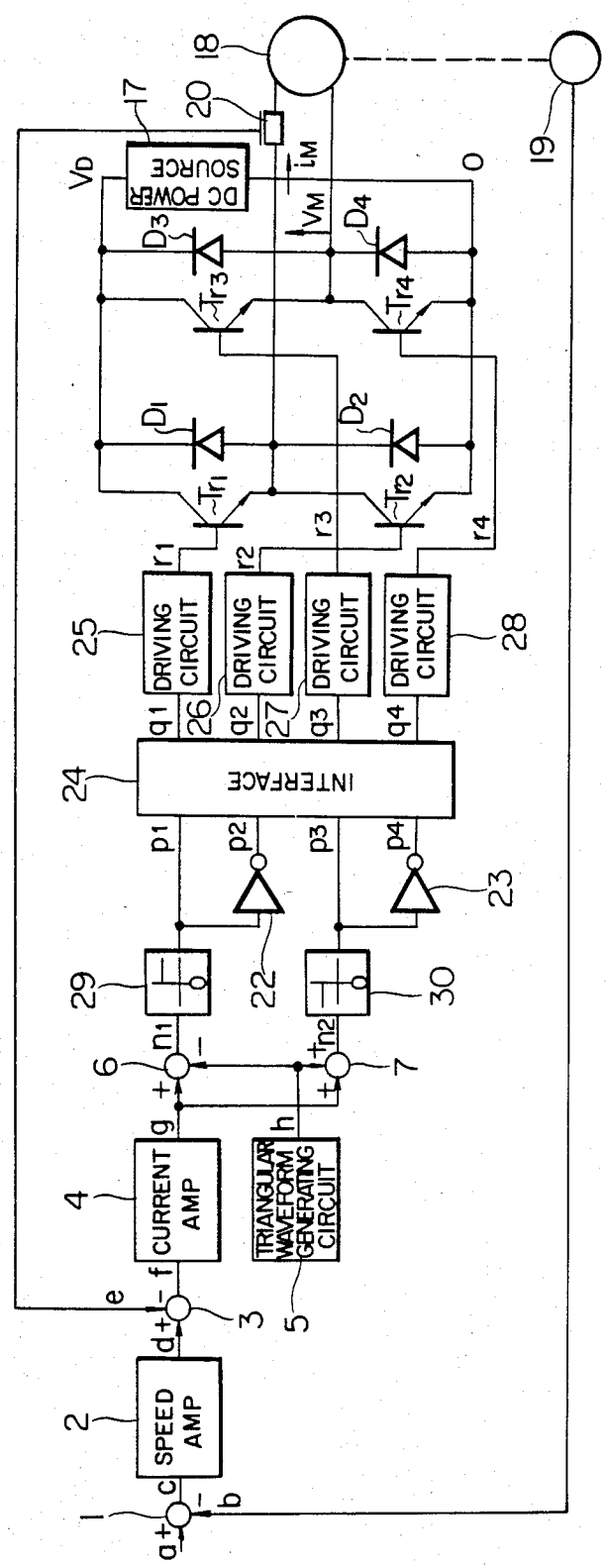
FIG. 5 is a block diagram showing the circuit construction of the DC motor control system of a preferred embodiment of the present invention.
Figure 6:
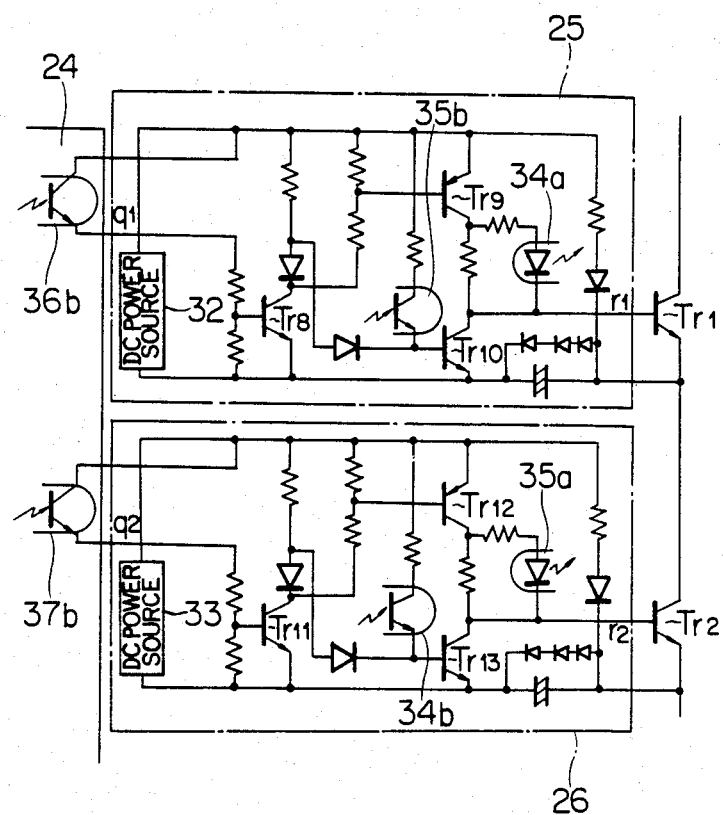
FIG. 6 is a circuit diagram showing the practical structure of two of the driving circuits in the DC motor control system of the present invention.
Figure 7:
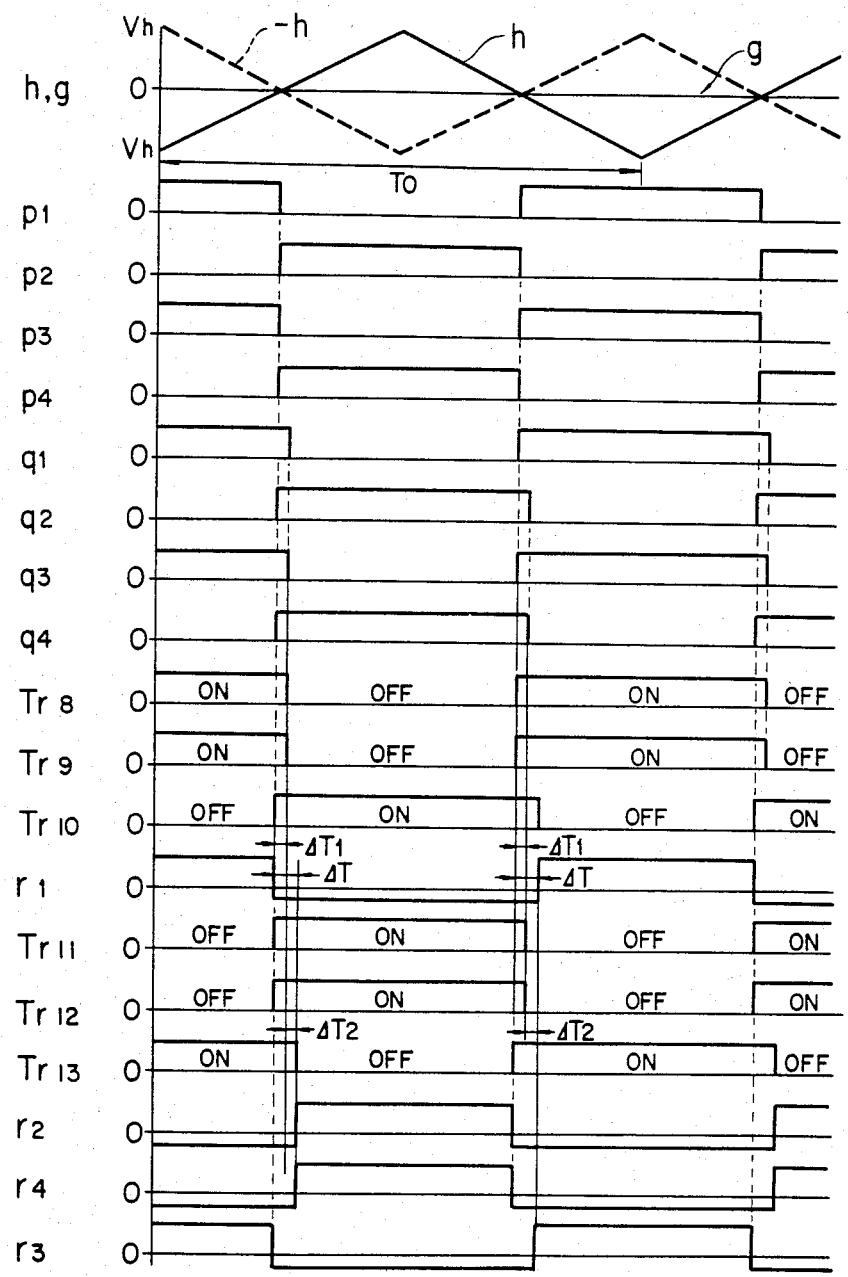
FIG. 7 shows operation waveforms at various parts of the electric circuits shown in FIGS. 5 and 6.

The DC motor control system of a preferred embodiment of the present invention will now be described with reference to FIGS. 5 to 7. FIG. 5 is a block diagram showing the circuit construction of the DC motor control system embodying the present invention, FIG. 6 is a circuit diagram showing the practical structure of power transistor driving circuits 25 and 26, and FIG. 7 shows operation waveforms at various parts of the electric circuits shown in FIGS. 5 and 6. In FIGS. 5, 6 and 7, same reference numerals are used to designate the same or equivalent parts appearing in FIGS. 1, 2, 3 and 4.

Referring to FIG. 5, a speed feedback signal b is subtracted from an externally applied speed command signal a in a subtractor 1, and an output signal c of the subtractor 1 is amplified by a speed amplifier 2 which generates a current command signal d. A current feedback signal e is subtracted from the current command signal d in a subtractor 3, and an output signal f of the subtractor 3 is amplified by a current amplifier 4 which generates a control signal g. Then, a triangular waveform signal h generated by a triangular waveform generating circuit 5 is subtracted from the control signal g in a subtractor 6 which outputs a signal $n_1$. At the same time, the signals h and g are added in an adder 7 which outputs a signal $n_2$. The signals $n_1$ and $n_2$ are applied to comparators 29 and 30, respectively. The comparator 29 generates an output pulse signal $p_1$ of a high level when the level of the input signal $n_1$ is higher than zero volt. The output pulse signal $p_1$ is applied to an interface circuit 24, and at the same time it is applied to an inverter 22 which generates an inverted output signal $p_2$ which is applied to the interface circuit 24. The comparator 30 generates an output pulse signal $p_3$ of a high level when the level of the input signal $n_2$ is lower than zero volt. The output pulse signal $p_3$ is applied to the interface circuit 24, and at the same time it is applied to an inverter 23 which generates an inverted output signal $p_4$ which is applied to the interface circuit 24.

Upon receipt of the input signals $p_1$, $p_2$, $p_3$ and $p_4$, the interface circuit 24 generates output signals $q_1$, $q_2$, $q_3$ and $q_4$ which, in turn, are converted into power transistor drive signals $r_1$, $r_2$, $r_3$ and $r_4$ through driving circuits 25, 26, 27 and 28, respectively. The drive signals $r_1$, $r_2$, $r_3$ and $r_4$ respectively drive power transistors $Tr_1$, $Tr_2$, $Tr_3$ and $Tr_4$, which are connected to form a bridge circuit. Further, as shown in FIG. 6, the output signal $q_1$ from a secondary phototransistor 36b of a photocoupler forming a part of the interface circuit 24 is applied to the driving circuit 25 to turn on transistors $Tr_8$ and $Tr_9$ when the signal $q_1$ is at a high level, thereby supplying a current to a primary photodiode 34a of a photocoupler 34 in the driving circuit 25. At this time, a transistor $Tr_{10}$ is in the conductive state, and the transistor $Tr_{10}$ is turned off upon turning-off of a secondary phototransistor 35b of a photocoupler 35 in the driving circuit 26, whereby the drive signal $r_1$ of a high level is generated from the driving circuit 25 to turn on the power transistor $Tr_1$. When the primary photodiode 34a of the photocoupler 34 is turned on, the secondary phototransistor 34b of the photocoupler 34 is turned on, which causes a transistor $Tr_{13}$ in the driving circuit 26 to conduct and hence the drive signal $r_2$ to disappear. Then, when the output signal $q_2$ from a secondary phototransistor 37b of a photocoupler forming a part of the interface circuit 24 turns to a high level, transistors $Tr_{11}$ and $Tr_{12}$ are turned on to supply a current to a primary photodiode 35a of the photocoupler 35 in the driving circuit 26. As a result, the secondary phototransistor 35b of the photocoupler 35 is turned on, which causes the transistor $Tr_{10}$ to conduct and hence the drive signal $r_1$ to disappear.

Then, when the signal $q_1$ ceases to be applied to the driving circuit 25, the transistors $Tr_8$ and $Tr_9$ are turned off and the current supplied to the primary photodiode 34a of the photocoupler 34 stops flowing, thereby causing the secondary phototransistor 34b of the photocoupler 34 to be turned off and hence a transistor $Tr_{13}$ to become nonconductive. As a result, the drive signal $r_2$ of a high level is applied to the base of the power transistor $Tr_2$ to turn the same conductive. Thus, the photocouplers 34 and 35 form an interlock circuit interlocking the drive signals $r_1$ and $r_2$. Reference numerals 32 and 33 designate DC power sources for the driving circuits 25 and 26, respectively.

The photocouplers used to constitute the interface circuit and interlock circuit are selected from among those whose output has a short rise time of the order of 1 to 2 $\mu$sec and a long fall time of the order of about 10 to 20 $\mu$sec, only the fall time being selected to be substantially the same among the photocouplers used. Such photocouplers are easily available and inexpensive.

Similarly to the prior art control system, in the DC motor control system of the present invention having the above-described construction, the repetition frequency of the current $i_M$ flowing through the DC motor 18 is twice that of the triangular waveform signal h. The voltage induced in the DC motor 18 is not fed back to a DC power source 17, as shown by the power transistor switching modes 1 and 2, but causes a current to flow through a closed circuit loop formed by the power transistors, flywheel diodes and DC motor. The power transistor switching modes of the control system of the present invention are the same as those of the prior art control system so as to minimize current ripples and ensure an operation with high efficiency and a low noise.

An explanation will be made hereunder with reference to FIG. 7, which shows operation waveforms at various parts of the electric circuits shown in FIGS. 5 and 6, as to assured provision of the time period $\Delta T$ during which both of the power transistor drive signals $r_1$, $r_2$ and both of the power transistor drive signals $r_3$, $r_4$ are not generated.

FIG. 7 shows a case where the control signal g is zero volt. Since the value of $\Delta T$ is not affected by the value of g as shown in FIG. 4 illustrating the operation of the prior art control system, the following description will be made with respect to the case of g=0 by way of example.

The output signal $p_1$ of the comparator 29 and the inverted signal $p_2$ thereof do not simultaneously have a low level. The output signals $q_1$ and $q_2$ from the photocouplers, which respectively form parts of the interface circuit 24 and receive the signals $p_1$ and $p_2$ as input signals thereto, have a negligibly short rise time. However, the signals $q_1$ and $q_2$ fall being delayed by a time period $\Delta T_1$ as compared with the fall of the signals $p_1$ and $p_2$, respectively. Therefore, during the time period $\Delta T_1$, both of the signals $q_1$ and $q_2$ are at a high level. Since the delay time of the transistors $Tr_8$ and $Tr_9$ in the driving circuit 25 and that of the transistors $Tr_{11}$ and $Tr_{12}$ in the driving circuit 26 are negligible, the conducting durations of the transistors $Tr_8$ and $Tr_9$ are equal to the high level time period of the signal $q_1$, and the conducting durations of the transistors $Tr_{11}$ and $Tr_{12}$ are equal to the high level time period of the signal $q_2$. The secondary phototransistors 34b and 35b of the photocouplers 34 and 35, respectively, are turned on simultaneously with the turning-on of the transistors $Tr_9$ and $Tr_{12}$, respectively, but the former are turned off with a delay time $\Delta T_2$ from the turning-off of the latter, respectively. The conducting durations of the transistors $Tr_{10}$ and $Tr_{13}$ are respectively equal to those of the secondary phototransistors 35b and 34b of the photocouplers 35 and 34, respectively. The drive signal $r_1$ is generated when the transistors $Tr_9$ and $Tr_{10}$ are turned on and off, respectively, and the drive signal $r_2$ is generated when the transistors $Tr_{12}$ and $Tr_{13}$ are turned on and off, respectively. Therefore, the time period $\Delta T$, during which both of the drive signals $r_1$ and $r_2$ are at a low level, is given by $(\Delta T_1 + \Delta T_2)$, and there is no mode in which both of the power transistors $Tr_1$ and $Tr_2$ become conductive at the same time.

Similarly, the photocouplers in the driving circuits 27 and 28 form an interlock circuit, so that the time period $\Delta T$, during which both of the drive signals $r_3$ and $r_4$ are at a low level, is given also by $(\Delta T_1 + \Delta T_2)$, and there is no mode in which both of the power transistors $Tr_3$ and $Tr_4$ become conductive at the same time.

Further, when the control signal g is zero, there is no mode in which both of the power transistors $Tr_1$ and $Tr_4$ or both of the power transistors $Tr_2$ and $Tr_3$ respectively become conductive at the same time, and the commonly nonconducting time period of the two power transistors, respectively, is similarly $\Delta T$. Therefore, the range of the value of g represented by $-\Delta V_1 \leqq g \leqq \Delta V_1$ provides the dead zone.

As will be understood from the foregoing descriptions, the present invention can realize a PWM control system for DC motors having a simplified circuit construction in which the dead zone in the PWM shaping circuit is eliminated to simplify its circuit construction, the cost of the interface circuit employing photocouplers or the like is reduced by the use of electric signals having no dead zone, and the output signal interlocking circuits, which are constituted by photocouplers and inherently provided with a dead zone, are disposed in the final switching element driving circuits thereby to provide complete nonconduction time period for paired switching elements connected in series across a DC power source, whereby power source short-circuiting trouble caused by simultaneous conduction of such paired switching elements can be prevented, even if a failure should occur in any circuit component and the like.

In the foregoing description of the embodiment of the present invention, the power transistors $Tr_1$ to $Tr_4$ have been referred to as a typical example of switching elements. However, it is apparent that the power transistors may be replaced by MOS FET's or the like.

We claim:

1. A DC motor control system comprising:
   a DC motor;
   a bridge circuit which is constituted by first, second, third and fourth switching elements and which is fed by a DC power source and has said DC motor connected thereto as an electric load thereon;
   a speed sensor for sensing a rotational speed of said DC motor;
   a current sensor for sensing an electric current flowing through said DC motor;
   a triangular waveform generator for generating a triangular waveform signal;
   an adder for adding the triangular waveform signal to a control signal obtained on the basis of an externally applied speed command signal and negative feedback signals supplied from said speed sensor and said current sensor;
   a subtractor for subtracting the triangular waveform signal from the control signal;
   a first comparator for generating an output signal when an output signal of said adder, which is applied to said first comparator, is at a level lower than zero volt;

a second comparator for generating an output signal when an output signal of said subtractor, which is applied to said second comparator, is at a level higher than zero volt;

first and second driving circuits to which the output signal of said first comparator and an inverted signal thereof are applied respectively through an interface circuit; and third and fourth driving circuits to which the output signal of said second comparator and an inverted signal thereof are applied respectively through said interface circuit, said first and second driving circuits and said third and fourth driving circuits being provided with respective output signal interlocking circuits, whereby said third and fourth switching elements connected in series across said DC power source are driven by said first and second driving circuits, respectively, and said first and second switching elements connected in series across said DC power source are driven by said third and fourth driving circuits, respectively.

2. A DC motor control system as claimed in claim 1, wherein said switching elements are power transistors.

3. A DC motor control system as claimed in claim 1, wherein said interlocking circuits are constituted by photocouplers.

4. A DC motor control system as claimed in claim 1, wherein said switching elements are power transistors, and said interlocking circuits are constituted by photocouplers.

5. A DC motor control system comprising:
a speed sensor for sensing a rotational speed of a DC motor;
a current sensor for sensing an electric current flowing through said DC motor;
a triangular waveform generator for generating a triangular waveform signal;
an adder for adding the triangular waveform signal to a control signal obtained on the basis of an externally applied speed command signal and negative feedback signals supplied from said speed sensor and said current sensor;
a subtractor for subtracting the triangular waveform signal from the control signal;
a first comparator for generating an output signal when an output signal of said adder, which is applied to said first comparator, is at a level lower than zero volt;
a second comparator for generating an output signal when an output signal of said subtractor, which is applied to said second comparator, is at a level higher than zero volt;
first and second driving circuits to which the output signal of said first comparator and an inverted signal thereof are applied respectively through an interface circuit;
third and fourth driving circuits to which the output signal of said second comparator and an inverted signal thereof are applied respectively through said interface circuit;
third and fourth switching elements connected in series across a DC power source which are driven by said first and second driving circuits, respectively, and first and second switching elements connected in series across said DC power source which are driven by said third and fourth driving circuits, respectively; and
a DC motor connected across output ends of a bridge circuit constituted by said first, second, third and fourth switching elements,
said first and second driving circuits and said third and fourth driving circuits being provided with respective output signal interlocking circuits.

6. A DC motor control system comprising:
a DC motor;
a bridge circuit which is constituted by first, second, third and fourth power transistors and which is fed by a DC power source and has said DC motor connected thereto as an electric load thereon;
a speed sensor for sensing a rotational speed of said DC motor;
a current sensor for sensing an electric current flowing through said DC motor;
a triangular waveform generator for generating a triangular waveform signal;
an adder for adding the triangular waveform signal to a control signal obtained on the basis of an externally applied speed command signal and negative feedback signals supplied from said speed sensor and said current sensor;
a subtractor for subtracting the triangular waveform signal from the control signal;
a first comparator for generating an output signal when an output signal of said adder, which is applied to said first comparator, is at a level lower than zero volt;
a second comparator for generating an output signal when an output signal of said subtractor, which is applied to said second comparator, is at a level higher than zero volt;
first and second inverters for receiving the output signals generated by said first and second comparators and producing inverted output signals, respectively;
first and second driving circuits to which the output signal of said first comparator and the output signal of said first inverter are applied as input signals thereto, respectively, through an interface circuit comprising photocouplers therein; and
third and fourth driving circuits to which the output signal of said second comparator and the output signal of said second inverter are applied as input signals thereto, respectively, through said interface circuit,
said first and second driving circuits and said third and fourth driving circuits being provided with respective output signal interlocking circuits,
whereby said third and fourth power transistors connected in series across said DC power source are driven by said first and second driving circuits, respectively, and said first and second power transistors connected in series across said DC power source are driven by said third and fourth driving circuits, respectively.

* * * * *